US005682127A

United States Patent [19]

Schmitz et al.

[11] Patent Number: 5,682,127

[45] Date of Patent: Oct. 28, 1997

[54] METHOD OF SWITCHING AN ELECTROMAGNETIC ACTUATOR

[75] Inventors: Günter Schmitz, Aachen; Stefan Grass, Kreuzau, both of Germany

[73] Assignee: FEV Motorentechnik GmbH & Co. KG, Aachen, Germany

[21] Appl. No.: 681,982

[22] Filed: Jul. 30, 1996

[30] Foreign Application Priority Data

Aug. 8, 1995 [DE] Germany ........................ 195 29 151.4

[51] Int. Cl.[6] .............................. H01F 7/08; H02K 33/00

[52] U.S. Cl. ........................... 335/228; 318/128; 361/159

[58] Field of Search ............................. 335/228; 318/128, 318/135; 361/159

[56] References Cited

U.S. PATENT DOCUMENTS

| | | | |
|---|---|---|---|
| 809,796 | 1/1906 | Grabosch | 273/406 |
| 4,080,552 | 3/1978 | Brown | 318/128 |
| 4,884,954 | 12/1989 | Van Niekerk | 318/122 |
| 4,908,731 | 3/1990 | Richeson, Jr. | 335/234 |
| 4,969,662 | 11/1990 | Stuart | 280/707 |

*Primary Examiner*—Stuart N. Hecker
*Attorney, Agent, or Firm*—Spencer & Frank

[57] ABSTRACT

A method of switching an electromagnetic actuator which includes an armature movable along a path of travel and two electromagnets having respective solenoids, disposed at opposite ends of the path of travel for alternatingly attracting the armature. The method includes the steps of alternatingly applying a supply voltage to the electromagnets for alternatingly causing a supply current to flow therethrough for effecting a reciprocating motion of the armature; and applying an induced current, generated by an induced voltage appearing across one of the solenoids upon removal of the supply current from the one solenoid, to the other of the solenoids until the supply voltage applied to the other solenoid is greater than the induced voltage and the supply voltage across the other solenoid is capable of maintaining an attained current flow therethrough.

1 Claim, 1 Drawing Sheet

METHOD OF SWITCHING AN ELECTROMAGNETIC ACTUATOR

CROSS REFERENCE TO RELATED APPLICATION

This application claims the priority of German Application No. 195 29 151.4 filed Aug. 8, 1995, which is incorporated herein by reference.

BACKGROUND OF THE INVENTION

In an electromagnetic actuator which includes two electromagnets between which an armature, functioning as an actuating member, is moved back and forth against the force of a return spring, high switching speeds and large switching forces are often simultaneous requirements.

Electromagnetic actuators of the above-outlined type are used, for example, for operating cylinder valves of internal combustion engines. Each cylinder valve is actuated by the armature of the associated electromagnetic actuator. The armature which, by virtue of the forces of the return springs, assumes its position of rest between the two electromagnets, is alternatingly attracted by the one or the other electromagnet, and, accordingly, the cylinder valve is maintained in its closed or open position. If the valve is to be operated, for example, to be moved from the closed position into the open position, the holding current flowing through the electromagnet functioning as the closing magnet is interrupted. As a result, the holding force of the electromagnet falls below the spring force and the armature, accelerated by the spring force, begins to move. After the armature traverses its position of rest, the motion of the armature is braked by the spring force of the oppositely located return spring. To catch and hold the armature in the open position of the cylinder valve, current is applied to the other electromagnet, then functioning as an opening magnet.

To securely catch the armature, because of the inductive behavior of the coils of the electromagnets, either the current supply has to begin very early to ensure that the current attains the required intensity in time, or a steep current increase has to be effected by means of a relatively high voltage. The latter alternative may be realized by providing a second high supply voltage. The additional structural input required therefor may be saved in principle by applying very early the current to the catching electromagnet. Such a procedure, however, is disadvantageous from the point of view of energy economy because the current in such a case builds up over a relatively large period of time during which large losses occur. Further, to maintain defined operational modes, in such an operation the current has to be applied at a time when no current flows yet through the opposite electromagnet. Such a proceeding is required, for example, if for starting from the position of rest by alternating excitation of the two electromagnets, the oscillation should be approximately at the natural resonance frequency of the spring/mass system.

SUMMARY OF THE INVENTION

It is an object of the invention to provide an improved method by means of which without additional energy input a rapid current increase is effected in that electromagnet which at that time functions as the catching electromagnet.

This object and others to become apparent as the specification progresses, are accomplished by the invention, according to which, briefly stated, the method of switching an electromagnetic actuator includes the steps of alternatingly applying a supply voltage to two electromagnets, having respective solenoids, disposed at opposite ends of the path of travel for alternatingly causing a supply current to flow therethrough for effecting a reciprocating motion of the armature; and applying an induced current, generated by an induced voltage appearing across one of the solenoids upon removal of the supply current from the one solenoid, to the other of the solenoids until the supply voltage applied to the other solenoid is greater than the induced voltage and the supply voltage across the other solenoid is capable of maintaining an attained current flow therethrough.

In the mode of operation according to the invention as outlined above, advantage is taken of the effect that upon discontinuing the current supply to one electromagnet, the current, due to the inductive behavior of the solenoid, cannot drop suddenly to zero because in the solenoid a voltage buildup occurs which brings a point at one end of the solenoid to a higher potential than a point at the opposite end. By means of appropriate circuit measures it can be achieved that the current induced in the deenergized solenoid flows through the solenoid of the other electromagnet which is to be energized. Since the solenoid of the electromagnet to be energized opposes such a current flow because of its inductive behavior, the voltage supplied by the deenergized solenoid rises to a very high value in order to drive the current with a steep current increase through the solenoid to be energized. Because of the energy losses and the weakening current increase, the voltage across the solenoid of the electromagnet—which in the meantime has been energized—decreases until the voltage provided by the current supply is greater and thus may sustain the attained current flow. In this manner it is possible to comply with the requirement for high switching speeds at simultaneously high switching forces.

DESCRIPTION OF THE PREFERRED EMBODIMENT

Figure 1:
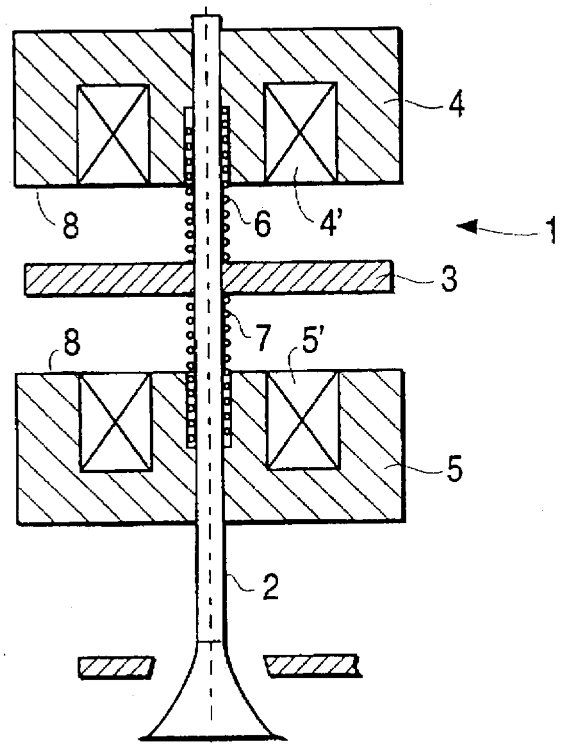
FIG. 1 is a sectional side elevational view of an electromagnetic actuator for operating a cylinder valve.

The electromagnetic actuator 1 shown in FIG. 1 has an armature 3 attached to the stem of a cylinder valve 2, a closing magnet 4 having a solenoid 4' and an opening magnet 5 having a solenoid 5'. When both magnets 4 and 5 are in a deenergized state, the armature 3 is held by return springs 6 and 7 in a position of rest between the two magnets 4 and 5. The distance of the armature 3 from the respective pole faces 8 of the magnets and 5 depends from the setting of the return springs 6 and 7. In the illustrated embodiment the return springs 6 and 7 are identically set so that the position of rest of the armature 3 is situated at mid point between the two pole faces 8 as illustrated in FIG. 1. In the closed position of the cylinder valve 2 the armature 3 engages the pole face 8 of the closing magnet 4.

For operating the cylinder valve 2, that is, for initiating a motion from the closed position into the open position, the holding current flowing through the closing magnet 4 is interrupted. As a result, the holding force of the closing magnet 4 falls below the spring force of the return spring 6 and the armature 3 starts to move, accelerated by spring force. After the armature 3 traverses its position of rest, the motion of the armature is braked by the spring force of the return spring 7 associated with the opening magnet 5. In order to catch the armature 3, to move it into the open position and to maintain it therein, current is applied to the opening magnet 5 so that the armature 3 eventually engages the pole face 8 of the electromagnet 5. For closing the cylinder valve, the switching and motion sequences occur in the reverse sense.

Figure 2:
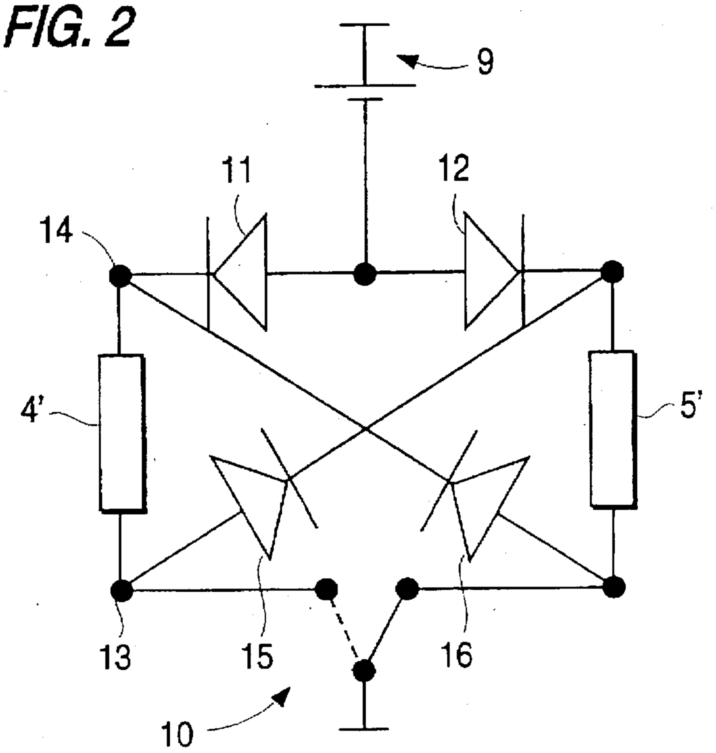
FIG. 2 is a diagram of a circuit for controlling current supply to the actuator according to a preferred embodiment of the invention.

FIG. 2 illustrates a circuit by means of which the build-up of the magnetic field in the catching electromagnet can be accelerated to thus shorten the switching times when the current supply is switched from one of the electromagnets 4 or 5 to the other. The circuit which contains the two solenoids 4' and 5' of the respective electromagnets 4 and 5 is connected to a current supply 9. By means of a switch 10 which may be reciprocated by an appropriate control device, the current supply 9 is alternatingly connected to the one or the other solenoid 4' or 5'. Thus, by a corresponding back-and-forth motion of the switch 10 the above-described back-and-forth motion of the armature 3 between the two electromagnets 4 and 5 may be controlled.

If the switch 10 is situated in its phantom-line position which means that the electromagnet 4 is energized, supply current flows via the diode 11 through the electromagnet 4. As soon as the switch 10 is moved into its full-line position, supply current flows via the diode 12 through the electromagnet 5.

Since the current at the coil of the electromagnet 4, because of the inductive behavior of the electromagnet 4, cannot suddenly drop to zero, in the electromagnet 4 an induced voltage builds up which brings point 13 at one end of the solenoid 4' to a higher potential than point 14 at the opposite end of the solenoid 4'. As a result, an induced current starts to flow from point 13 via a diode 15 through the solenoid 5' of the electromagnet 5 and therefrom via a diode 16 to the point 14. Since the solenoid 5' of the electromagnet 5 initially opposes such a current flow because of its inductive behavior, the voltage supplied by the solenoid 4' of the electromagnet 4 rises to a very high value to drive the current through the solenoid 5' of the electromagnet 5. In this manner a steep current increase through the solenoid 5' of the electromagnet 5 is achieved. Because of the energy loss and the weakening current increase, the voltage of the electromagnet 5 drops until the supply voltage available via the diode 12 is greater and the then-achieved current flow may be maintained. If the switch 10 again changes its switching position as a result of a triggering by a control device, the above-described sequence occurs in a reverse order.

The above-described method is not limited to the described circuit, and is particularly not limited to the circuit elements set forth and illustrated. The function of the switch 10 may be expediently assumed by a semiconductor switch. Also, instead of the described and shown diodes, semiconductor switches, transistors or preferably thyristors may be used to thus render the process controllable. By virtue of this arrangement in internal combustion engines whose cylinder valves are operated by an electromagnetic actuator, it is feasible to render inactive the above-described special mode of operation if, for given operational reasons such an effect is not desired. In any event, care has to be taken that the used circuit elements have a sufficient voltage stability.

It will be understood that the above description of the present invention is susceptible to various modifications, changes and adaptations, and the same are intended to be comprehended within the meaning and range of equivalents of the appended claim.

What is claimed is:

1. A method of switching an electromagnetic actuator including an armature movable along a path of travel and electromagnets, including respective solenoids, disposed at opposite ends of said path of travel for alternatingly attracting the armature; said method comprising the following steps:

(a) alternatingly applying a supply voltage to said electromagnets for alternatingly causing a supply current to flow therethrough for effecting a reciprocating motion of the armature; and (b) applying an induced current, generated by an induced voltage appearing across one of the solenoids upon removal of the supply current from said one solenoid, to the other of said solenoids until the supply voltage applied to said other solenoid is greater than said induced voltage and said supply voltage across said other solenoid is capable of maintaining an attained current flow therethrough.

* * * * *